H. & F. Wegner,

Knife Cleaner.

No. 106,897. Patented Aug. 30, 1870

Witnesses
Alex. Selkirk
John Richard

Harmon Wegner
Frederick Wegner
Inventors.
per Alex. Selkirk
Attorney for Applicants

N. PETERS, PHOTO-LITHOGRAPHER, WASHINGTON, D.C.

United States Patent Office.

HERRMAN WEGNER AND FRIEDRICH WEGNER, OF WEST TROY, NEW YORK.

Letters Patent No. 106,897, dated August 30, 1870.

IMPROVED KNIFE AND FORK-CLEANER.

The Schedule referred to in these Letters Patent and making part of the same.

*To all whom it may concern:*

Be it known that we, HERRMAN WEGNER and FRIEDRICH WEGNER, of West Troy, State of New York, have invented certain new and useful Improvements in Machines for Cleaning Knives and Forks; and we do hereby declare that the following is a description thereof, reference being had to the accompanying drawing forming a part of this specification, in which—

The same letters indicate like parts.

In the drawing—

A represents a suitable box or frame-work for holding the several parts of this invention.

We place within the said box A a shaft, $g$, which shaft runs from side to side, and in proper bearings placed thereon, in any suitable manner.

Figure 2:
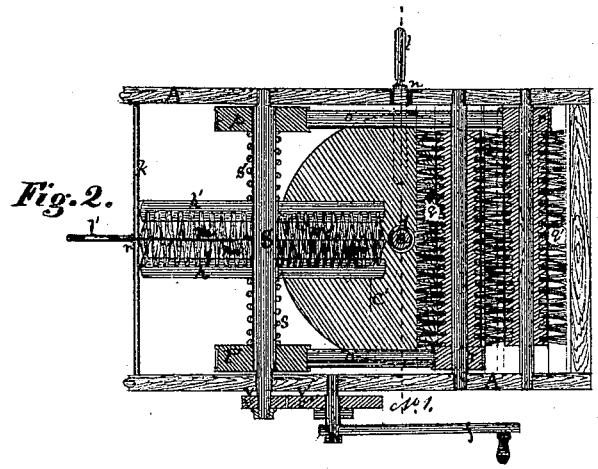
Figure 2 represents a vertical view of the same.

The said shaft $g$ is feathered in its center, as shown in fig. 2, and carries two revolving brushes, $h$ and $h'$, which brushes are circular in form, and have their bristles $m$, or other equivalent brushes, placed facing each other, and just in contact, as shown in fig. 2.

The said revolving brushes are crowded together by spiral springs $s\ s'$, coiled on their shaft $g$.

We place over a portion of the said revolving brushes $h$ and $h'$, a sort of drum, $k$, the inside of which is nearly in contact with the periphery of the said brushes.

Figure 1:
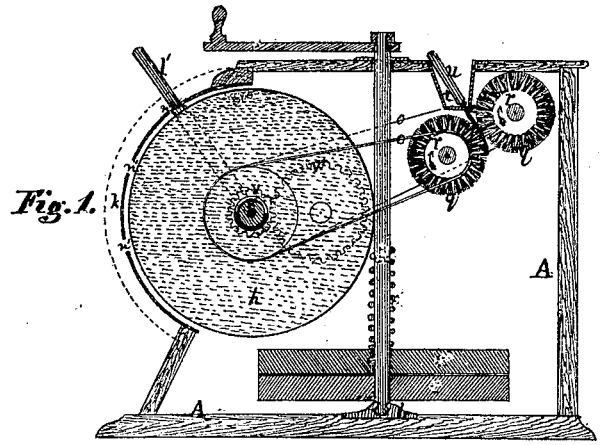
Figure 1 represents a side elevation of the machine.

In the said drum we make one or more slots, $n$, figs. 1 and 2, which slots are placed in front of the line of contact of said brushes $h$ and $h'$, and are to receive the blades of the knives $l'$ to be cleaned.

In use, the said brushes $h$ and $h'$ may be sprinkled with flour of emery, bath-brick, or equivalent polishing material.

We also attach to the shaft $g$, at each end of the same, the pulleys $p$, which pulleys $p$ are to give motion to a pair of cylindrical brushes, $q$ and $q'$, by means of the bands or belts $o\ o$ working from around the pulleys $p\ p$ on the shaft $g$, and on the pulleys $r\ r$ attached to the brushes $q$ and $q'$, and in such a manner that both the said brushes $q\ q'$ will revolve in the direction indicated by arrows in fig. 1.

The said brushes $q$ and $q'$ are placed in position so that their revolving surfaces will touch each other at their point of contact.

We place in close proximity with the contacting surfaces of the said brushes a sunken piece, $t$, which we denominate the fork-holder, which fork-holder is provided with one or more openings, $z$, through which the tines of the forks $u$ are to be inserted when they are to be cleaned.

We communicate motion to the brushes $h\ h'$ and $q\ q'$ by means of a pair of cog-wheels, $v\ v'$, the cog-wheel $v$ being attached to the shaft $g$ and operated by wheel $v'$, properly supported, which wheel $v'$ is revolved by a crank, $f$, fig. 2.

The several brushing parts can be made of bristles, splints, or other similar material generally used.

With this machine several knives and forks can be cleaned simultaneously.

The whole is simple in its construction and not liable to get out of order.

Having described our invention,

What we claim, and desire to secure by Letters Patent, is—

A knife and fork-cleaning machine, consisting of the brushes $h$ and $h'$, crowded by the springs $s\ s'$, the pulleys $p\ p$, bands $o\ o$, brushes $q\ q'$, cog-wheels $v\ v'$, crank $f$, the drum $k$ with slot-holes $n$, the fork-holder $t$ with its opening $z$, and all in combination and substantially in the manner set forth, for the purposes described.

HERRMAN WEGNER.
FRIEDRICH WEGNER.

Witnesses:
ALEX. SELKIRK,
JOHN RICHARD.